US009933176B2

United States Patent
Mutchnik et al.

(10) Patent No.: US 9,933,176 B2
(45) Date of Patent: Apr. 3, 2018

(54) LATENT CAPACITY ADJUSTMENT

(71) Applicant: Trane International Inc., Piscataway, NJ (US)

(72) Inventors: Karl Mutchnik, Tyler, TX (US); Carl L. Garrett, Tyler, TX (US); John Taylor, Taylor, TX (US); Timothy Wayne Storm, Tyler, TX (US); Rick St. Mars, Tyler, TX (US)

(73) Assignee: Trane International Inc., Piscataway, NJ (US)

(*) Notice: Subject to any disclaimer, the term of this patent is extended or adjusted under 35 U.S.C. 154(b) by 524 days.

(21) Appl. No.: 14/581,702

(22) Filed: Dec. 23, 2014

(65) Prior Publication Data

US 2015/0211757 A1 Jul. 30, 2015

Related U.S. Application Data

(60) Provisional application No. 61/931,466, filed on Jan. 24, 2014.

(51) Int. Cl.
*F24F 11/00* (2006.01)
*F24F 7/007* (2006.01)

(52) U.S. Cl.
CPC ........ *F24F 11/0015* (2013.01); *F24F 11/006* (2013.01); *F24F 11/0079* (2013.01); *F24F 2011/0073* (2013.01); *Y02B 30/746* (2013.01)

(58) Field of Classification Search
CPC ........... F24F 2011/0073; F24F 11/0015; F24F 11/006; F24F 11/0079
See application file for complete search history.

(56) References Cited

U.S. PATENT DOCUMENTS

| | | | |
|---|---|---|---|
| 4,257,238 A | 3/1981 | Kountz et al. | |
| 4,744,223 A | 5/1988 | Umezu | |
| 4,850,198 A | 7/1989 | Helt et al. | |
| 4,987,748 A | 1/1991 | Meckler | |
| 5,062,276 A | 11/1991 | Dudley | |
| 5,303,561 A | 4/1994 | Bahel et al. | |
| 5,450,893 A | 9/1995 | Galba et al. | |
| 5,743,100 A | 4/1998 | Welguisz et al. | |
| 5,915,473 A | 6/1999 | Ganesh et al. | |
| 6,996,999 B2 | 2/2006 | Wacker | |
| 7,191,607 B2 | 3/2007 | Curtis | |
| 7,640,761 B2 | 1/2010 | Garrett et al. | |
| 7,845,182 B2 | 12/2010 | Yelles | |
| 9,417,005 B1* | 8/2016 | Roth | F25D 17/06 |
| 2004/0140364 A1* | 7/2004 | Curtis, Sr. | B60H 1/00785 237/12 |
| 2005/0120012 A1* | 6/2005 | Poth | F24F 11/0086 |
| 2005/0150651 A1 | 7/2005 | Halsey | |
| 2008/0307803 A1* | 12/2008 | Herzon | F24F 3/147 62/93 |

(Continued)

*Primary Examiner* — Steven B McAllister
*Assistant Examiner* — Steven Anderson, II
(74) *Attorney, Agent, or Firm* — Conley Rose, P.C.; J. Robert Brown, Jr.

(57) ABSTRACT

Systems and methods of operating a heating, ventilation, and/or air conditioning (HVAC) system are disclosed that may include starting a timer substantially concurrently with the HVAC system, entering a cooling cycle, and preventing a multi-speed blower in the HVAC system from changing speeds until the timer expires.

10 Claims, 5 Drawing Sheets

(56) References Cited

U.S. PATENT DOCUMENTS

| | | | | |
|---|---|---|---|---|
| 2010/0314458 A1* | 12/2010 | Votaw | ............... | F24F 3/001 236/1 B |
| 2011/0155365 A1* | 6/2011 | Wiese | ............... | F24F 7/013 165/244 |
| 2015/0300673 A1* | 10/2015 | Dodds | ............ | F24F 11/0008 62/91 |
| 2015/0345819 A1* | 12/2015 | Ostrovsky | ......... | F24F 11/0015 236/44 A |

\* cited by examiner

LATENT CAPACITY ADJUSTMENT

CROSS-REFERENCE TO RELATED APPLICATIONS

The present application claims priority under 35 U.S.C. 119(e) to U.S. Provisional Patent Application No. 61/931,466 filed on Jan. 24, 2014 by Mutchnik, et al. and entitled "Latency Capacity Adjustment," the disclosure of which is hereby incorporated by reference in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Heating, ventilation, and air conditioning systems (HVAC systems) may be used to heat and/or cool comfort zones to comfortable temperatures. Comfort zones are often the occupiable portions of residential and/or commercial areas and may be subject to variable zone conditions, such as temperature and humidity. A portion of an HVAC system may be installed outdoors or in some other location remote from the comfort zone for the purpose of performing heat exchange. Such a location may be referred to as an ambient zone and may also have variable temperature and humidity conditions.

Some HVAC systems are heat pump systems. Heat pump systems are generally capable of operating in a cooling mode in which a comfort zone is cooled by transferring heat from the comfort zone to an ambient zone using a refrigeration cycle (e.g., the Rankine cycle). Heat pump systems are also generally capable of operating in a heating mode in which the direction of refrigerant flow through the components of the HVAC system is reversed so that heat is transferred from the ambient zone to the comfort zone, thereby heating the comfort zone. Heat pump systems generally use a reversing valve for rerouting the direction of refrigerant flow between the compressor and the heat exchangers associated with the comfort zone and the ambient zone.

SUMMARY

In an embodiment, a method of operating an HVAC system is provided. The method comprises starting a timer substantially concurrently with the HVAC system entering a cooling cycle and preventing a multi-speed blower in the HVAC system from changing speeds until the timer expires.

In another embodiment, an HVAC system is provided. The HVAC system comprises a system controller configured to prevent a multi-speed blower in the HVAC system from changing speeds until the expiration of a timer that is started substantially concurrently with the HVAC system entering a cooling cycle.

In another embodiment, a system controller for an HVAC system is provided. The system controller comprises a processor configured to prevent a multi-speed blower in the HVAC system from changing speeds until the expiration of a timer that is started substantially concurrently with the HVAC system entering a cooling cycle, further configured, after the timer has expired during the cooling cycle and the speed of the multi-speed blower has changed, to restart the timer substantially concurrently with changing the speed of the multi-speed blower, and further configured to prevent the multi-speed blower from changing speeds again during the cooling cycle until the timer expires again.

DETAILED DESCRIPTION

Figure 1:
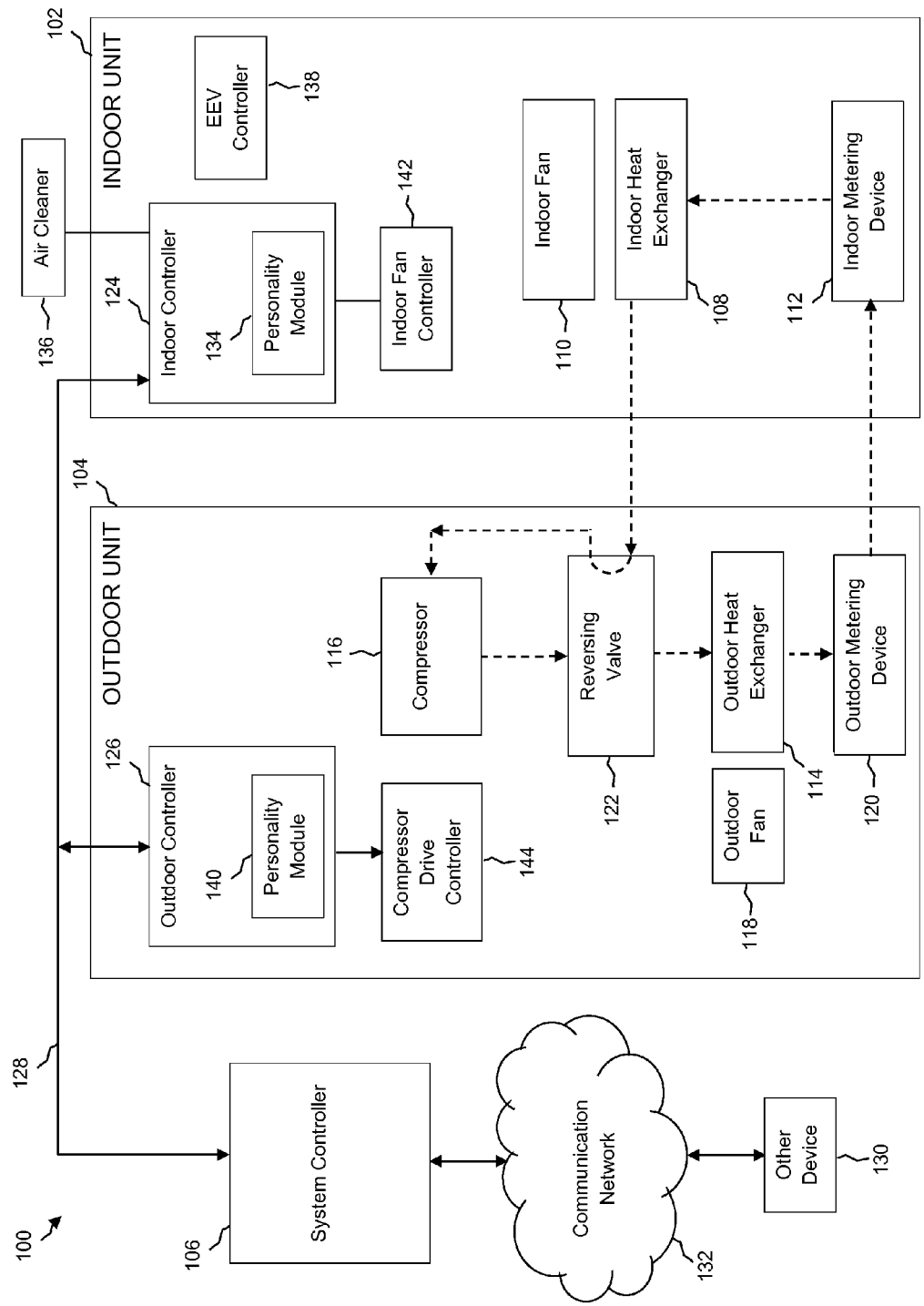
FIG. 1 is a schematic diagram of an HVAC system according to an embodiment of the disclosure.

Referring now to FIG. 1, a schematic diagram of an HVAC system 100 is shown according to an embodiment of this disclosure. HVAC system 100 comprises an indoor unit 102, an outdoor unit 104, and a system controller 106. In some embodiments, the system controller 106 may operate to control operation of the indoor unit 102 and/or the outdoor unit 104. As shown, the HVAC system 100 is a so-called heat pump system that may be selectively operated to implement one or more substantially closed thermodynamic refrigeration cycles to provide a cooling functionality and/or a heating functionality. In other embodiments, the HVAC system 100 may be some other type of heating, ventilation, and/or air conditioning system.

The indoor unit 102 comprises an indoor heat exchanger 108, an indoor fan 110, and an indoor metering device 112. The indoor heat exchanger 108 may be a plate fin heat exchanger configured to allow heat exchange between refrigerant carried within internal tubing of the indoor heat exchanger 108 and fluids that contact the indoor heat exchanger 108 but that are kept segregated from the refrigerant. In other embodiments, the indoor heat exchanger 108 may comprise a spine fin heat exchanger, a microchannel heat exchanger, or any other suitable type of heat exchanger.

The indoor fan 110 may be a centrifugal blower comprising a blower housing, a blower impeller at least partially disposed within the blower housing, and a blower motor configured to selectively rotate the blower impeller. In other embodiments, the indoor fan 110 may comprise a mixed-flow fan and/or any other suitable type of fan. The indoor fan 110 may be configured as a modulating and/or variable speed fan capable of being operated at many speeds over one or more ranges of speeds. In other embodiments, the indoor fan 110 may be configured as a multiple speed fan capable of being operated at a plurality of operating speeds by selectively electrically powering different ones of multiple electromagnetic windings of a motor of the indoor fan 110. In yet other embodiments, the indoor fan 110 may be a single speed fan.

The indoor metering device 112 may be an electronically controlled motor driven electronic expansion valve (EEV). In alternative embodiments, the indoor metering device 112 may comprise a thermostatic expansion valve, a capillary tube assembly, and/or any other suitable metering device. The indoor metering device 112 may comprise and/or be associated with a refrigerant check valve and/or refrigerant bypass for use when a direction of refrigerant flow through the indoor metering device 112 is such that the indoor metering device 112 is not intended to meter or otherwise substantially restrict flow of refrigerant through the indoor metering device 112.

The outdoor unit 104 comprises an outdoor heat exchanger 114, a compressor 116, an outdoor fan 118, an outdoor metering device 120, and a reversing valve 122. The outdoor heat exchanger 114 may be a spine fin heat exchanger configured to allow heat exchange between refrigerant carried within internal passages of the outdoor heat exchanger 114 and fluids that contact the outdoor heat exchanger 114 but that are kept segregated from the refrigerant. In other embodiments, the outdoor heat exchanger 114 may comprise a plate fin heat exchanger, a microchannel heat exchanger, or any other suitable type of heat exchanger.

The compressor 116 may be a multiple speed scroll type compressor configured to selectively pump refrigerant at a plurality of mass flow rates. In alternative embodiments, the compressor 116 may be a modulating compressor capable of operation over one or more speed ranges, a reciprocating type compressor, a single speed compressor, and/or any other suitable refrigerant compressor and/or refrigerant pump.

The outdoor fan 118 may be an axial fan comprising a fan blade assembly and fan motor configured to selectively rotate the fan blade assembly. In other embodiments, the outdoor fan 118 may comprise a mixed-flow fan, a centrifugal blower, and/or any other suitable type of fan and/or blower. The outdoor fan 118 may be configured as a modulating and/or variable speed fan capable of being operated at many speeds over one or more ranges of speeds. In other embodiments, the outdoor fan 118 may be configured as a multiple speed fan capable of being operated at a plurality of operating speeds by selectively electrically powering different ones of multiple electromagnetic windings of a motor of the outdoor fan 118. In yet other embodiments, the outdoor fan 118 may be a single speed fan.

The outdoor metering device 120 may be a thermostatic expansion valve. In alternative embodiments, the outdoor metering device 120 may comprise an electronically controlled motor driven EEV, a capillary tube assembly, and/or any other suitable metering device. The outdoor metering device 120 may comprise and/or be associated with a refrigerant check valve and/or refrigerant bypass for use when a direction of refrigerant flow through the outdoor metering device 120 is such that the outdoor metering device 120 is not intended to meter or otherwise substantially restrict flow of refrigerant through the outdoor metering device 120.

The reversing valve 122 may be a so-called four-way reversing valve. The reversing valve 122 may be selectively controlled to alter a flow path of refrigerant in the HVAC system 100 as described in greater detail below. The reversing valve 122 may comprise an electrical solenoid or other device configured to selectively move a component of the reversing valve 122 between operational positions.

The system controller 106 may comprise a touchscreen interface for displaying information and for receiving user inputs. The system controller 106 may display information related to the operation of the HVAC system 100 and may receive user inputs related to operation of the HVAC system 100. The system controller 106 may further be operable to display information and receive user inputs tangentially related and/or unrelated to operation of the HVAC system 100. In some embodiments, the system controller 106 may comprise a temperature sensor and may further be configured to control heating and/or cooling of zones associated with the HVAC system 100. In some embodiments, the system controller 106 may be configured as a thermostat for controlling the supply of conditioned air to zones associated with the HVAC system 100.

In some embodiments, the system controller 106 may selectively communicate with an indoor controller 124 of the indoor unit 102, with an outdoor controller 126 of the outdoor unit 104, and/or with other components of the HVAC system 100. In some embodiments, the system controller 106 may be configured for selective bidirectional communication over a communication bus 128. In some embodiments, portions of the communication bus 128 may comprise a three-wire connection suitable for communicating messages between the system controller 106 and one or more of the HVAC system components configured for interfacing with the communication bus 128.

Still further, the system controller 106 may be configured to selectively communicate with HVAC system components and/or another device 130 via a communication network 132. In some embodiments, the communication network 132 may comprise a telephone network and the other device 130 may comprise a telephone. In some embodiments, the communication network 132 may comprise the Internet and the other device 130 may comprise a so-called smartphone and/or other Internet-enabled mobile telecommunication device.

The indoor controller 124 may be carried by the indoor unit 102 and may be configured to receive information inputs, transmit information outputs, and otherwise communicate with the system controller 106, the outdoor controller 126, and/or any other device via the communication bus 128 and/or any other suitable medium of communication. In some embodiments, the indoor controller 124 may be configured to communicate with an indoor personality module 134, receive information related to a speed of the indoor fan 110, transmit a control output to an electric heat relay, transmit information regarding an indoor fan volumetric flow rate, communicate with and/or otherwise affect control over an air cleaner 136, and communicate with an indoor EEV controller 138. In some embodiments, the indoor controller 124 may be configured to communicate with an indoor fan controller 142 and/or otherwise affect control over operation of the indoor fan 110. In some embodiments, the indoor personality module 134 may comprise information related to the identification and/or operation of the indoor unit 102 and/or a position of the outdoor metering device 120.

In some embodiments, the indoor EEV controller 138 may be configured to receive information regarding temperatures and pressures of the refrigerant in the indoor unit 102. More specifically, the indoor EEV controller 138 may be configured to receive information regarding temperatures and pressures of refrigerant entering, exiting, and/or within the indoor heat exchanger 108. Further, the indoor EEV controller 138 may be configured to communicate with the indoor metering device 112 and/or otherwise affect control over the indoor metering device 112.

The outdoor controller 126 may be carried by the outdoor unit 104 and may be configured to receive information inputs, transmit information outputs, and otherwise communicate with the system controller 106, the indoor controller 124, and/or any other device via the communication bus 128 and/or any other suitable medium of communication. In some embodiments, the outdoor controller 126 may be configured to communicate with an outdoor personality module 140 that may comprise information related to the identification and/or operation of the outdoor unit 104. In some embodiments, the outdoor controller 126 may be configured to receive information related to an ambient temperature associated with the outdoor unit 104, information related to a temperature of the outdoor heat exchanger 114, and/or information related to refrigerant temperatures and/or pressures of refrigerant entering, exiting, and/or within the outdoor heat exchanger 114 and/or the compressor 116. In some embodiments, the outdoor controller 126 may be configured to transmit information related to monitoring, communicating with, and/or otherwise affecting control over the outdoor fan 118, a compressor sump heater, a solenoid of the reversing valve 122, a relay associated with adjusting and/or monitoring a refrigerant charge of the HVAC system 100, a position of the indoor metering device 112, and/or a position of the outdoor metering device 120. The outdoor controller 126 may further be configured to communicate with a compressor drive controller 144 that is configured to electrically power and/or control the compressor 116.

The HVAC system 100 is shown configured for operating in a so-called cooling mode in which heat is absorbed by refrigerant at the indoor heat exchanger 108 and heat is rejected from the refrigerant at the outdoor heat exchanger 114. In some embodiments, the compressor 116 may be operated to compress refrigerant and pump the relatively high temperature and high pressure compressed refrigerant from the compressor 116 through the reversing valve 122 to the outdoor heat exchanger 114. As the refrigerant is passed through the outdoor heat exchanger 114, the outdoor fan 118 may be operated to move air into contact with the outdoor heat exchanger 114, thereby transferring heat from the refrigerant to the air surrounding the outdoor heat exchanger 114. The refrigerant may primarily comprise liquid phase refrigerant and the refrigerant may be pumped from the outdoor heat exchanger 114 to the indoor metering device 112 through and/or around the outdoor metering device 120, which does not substantially impede flow of the refrigerant in the cooling mode. The indoor metering device 112 may meter passage of the refrigerant through the indoor metering device 112 so that the refrigerant downstream of the indoor metering device 112 is at a lower pressure than the refrigerant upstream of the indoor metering device 112. The pressure differential across the indoor metering device 112 allows the refrigerant downstream of the indoor metering device 112 to expand and/or at least partially convert to a gaseous phase. The gaseous phase refrigerant may enter the indoor heat exchanger 108. As the refrigerant is passed through the indoor heat exchanger 108, the indoor fan 110 may be operated to move air into contact with the indoor heat exchanger 108, thereby transferring heat to the refrigerant from the air surrounding the indoor heat exchanger 108. The refrigerant may thereafter reenter the compressor 116 after passing through the reversing valve 122.

To operate the HVAC system 100 in the so-called heating mode, the reversing valve 122 may be controlled to alter the flow path of the refrigerant, the indoor metering device 112 may be disabled and/or bypassed, and the outdoor metering device 120 may be enabled. In the heating mode, refrigerant may flow from the compressor 116 to the indoor heat exchanger 108 through the reversing valve 122. The refrigerant may be substantially unaffected by the indoor metering device 112 and may experience a pressure differential across the outdoor metering device 120. The refrigerant may pass through the outdoor heat exchanger 114 and reenter the compressor 116 after passing through the reversing valve 122. In general, operation of the HVAC system 100 in the heating mode reverses the roles of the indoor heat exchanger 108 and the outdoor heat exchanger 114 as compared to their operation in the cooling mode.

The HVAC system 100 is shown as a so-called split system, wherein the indoor unit 102 is located separately from the outdoor unit 104. Alternative embodiments of an HVAC system may comprise a so-called package system in which one or more of the components of the indoor unit 102 and one or more of the components of the outdoor unit 104 are carried together in a common housing or package. The HVAC system 100 is shown as a so-called ducted system where the indoor unit 102 is located remote from the conditioned zones, thereby requiring air ducts to route the circulating air. However, in alternative embodiments, an HVAC system may be configured as a non-ducted system in which the indoor unit 102 and/or multiple indoor units 102 associated with an outdoor unit 104 are located substantially in the space and/or zone to be conditioned by the respective indoor units 102, thereby not requiring air ducts to route the air conditioned by the indoor units 102.

Figure 2:
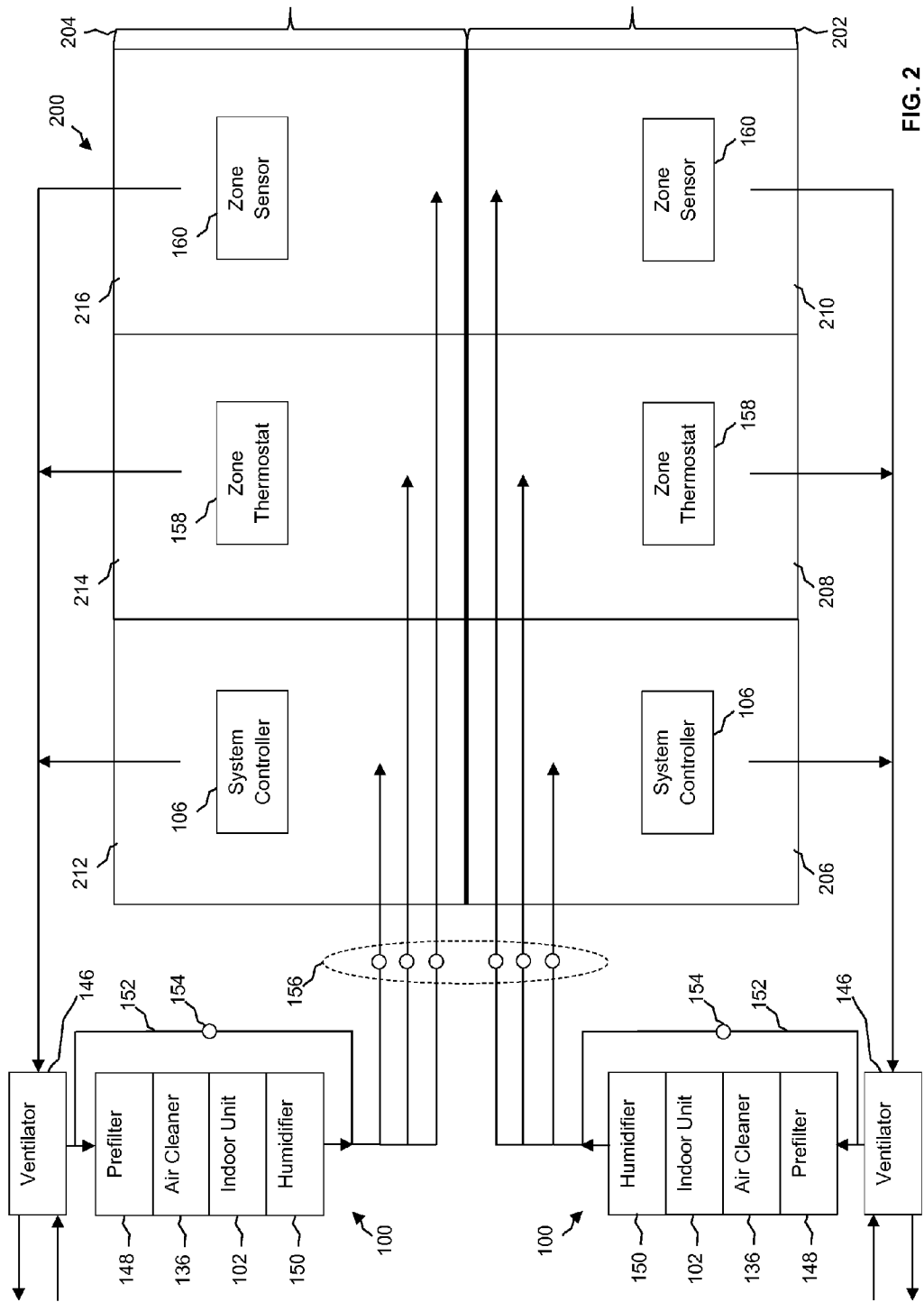
FIG. 2 is a schematic diagram of the air circulation paths of the HVAC system of FIG. 1.

Referring now to FIG. 2, a schematic diagram of the air circulation paths for a structure 200 conditioned by two HVAC systems 100 is shown. In this embodiment, the structure 200 is conceptualized as comprising a lower floor 202 and an upper floor 204. The lower floor 202 comprises zones 206, 208, and 210, while the upper floor 204 comprises zones 212, 214, and 216. The HVAC system 100 associated with the lower floor 202 is configured to circulate and/or condition air of lower zones 206, 208, and 210, while the HVAC system 100 associated with the upper floor 204 is configured to circulate and/or condition air of upper zones 212, 214, and 216.

In addition to the components of the HVAC system 100 described above, in this embodiment, each HVAC system 100 further comprises a ventilator 146, a prefilter 148, a humidifier 150, and a bypass duct 152. The ventilator 146 may be operated to selectively exhaust circulating air to the environment and/or introduce environmental air into the circulating air. The prefilter 148 may generally comprise a filter medium selected to catch and/or retain relatively large particulate matter prior to air exiting the prefilter 148 and entering the air cleaner 136. The humidifier 150 may be operated to adjust the humidity of the circulating air. The bypass duct 152 may be utilized to regulate air pressures within the ducts that form the circulating air flow paths. In some embodiments, air flow through the bypass duct 152 may be regulated by a bypass damper 154, while air flow delivered to the zones 206, 208, 210, 212, 214, and 216 may be regulated by zone dampers 156.

Each HVAC system 100 may further comprise a zone thermostat 158 and a zone sensor 160. In some embodiments, a zone thermostat 158 may communicate with the system controller 106 and may allow a user to control a temperature, humidity, and/or other environmental setting for the zone in which the zone thermostat 158 is located. Further, the zone thermostat 158 may communicate with the system controller 106 to provide temperature, humidity, and/or other environmental feedback regarding the zone in which the zone thermostat 158 is located. In some embodiments, a zone sensor 160 may communicate with the system controller 106 to provide temperature, humidity, and/or other environmental feedback regarding the zone in which the zone sensor 160 is located.

The system controllers 106 may be configured for bidirectional communication with each other and may further be configured so that a user may, using either of the system controllers 106, monitor and/or control any of the HVAC system components regardless of which zones the components may be associated with. Further, each system controller 106, each zone thermostat 158, and each zone sensor 160 may comprise a humidity sensor. As such, it will be appreciated that structure 200 may be equipped with a plurality of humidity sensors in a plurality of different locations. In some embodiments, a user may effectively select which of the plurality of humidity sensors is used to control operation of one or more of the HVAC systems 100.

An HVAC system such as the HVAC system 100 may be equipped with an indoor fan or blower that can operate at a plurality of speeds, such as a high speed and a low speed; a high speed, a medium speed, and a low speed; or some other combination of speeds. The speed of the blower may be controlled by a relay, wherein one relay state causes operation at a high speed and the other relay state causes operation at a low speed. Alternatively, the speed of the blower may be controlled by a pulse width modulation (PWM) signal, wherein different pulse widths cause operation at different blower speeds. Alternatively, the speed of the blower may be controlled in some other manner. Regardless of the number of possible speeds and the manner in which the speeds are controlled, any indoor fan or blower capable of operating at more than one speed will be referred to herein as a multi-speed blower. References herein to a change in the speed of a multi-speed blower refer to a transition from one of a plurality of speeds to another of a plurality of speeds, and not to stopping or starting the blower.

When an HVAC system is in the cooling mode, operating a multi-speed blower at a lower speed may remove more moisture from the indoor air than operating the multi-speed blower at a higher speed. That is, a lower blower speed allows the indoor cooling coil to operate at a lower temperature, which removes more grains of water per unit time from the indoor air than operating the indoor cooling coil at a higher temperature.

An HVAC system that is equipped with a multi-speed blower may also be equipped with a humidity sensor, either as part of the system controller or as a separate component that can communicate with the system controller. In either case, the humidity sensor may provide the system controller with information regarding the humidity level in the indoor space managed by the system controller. In such systems, when the cooling mode is active and the system controller receives from the humidity sensor an indication that the humidity in the indoor space is above a first set point or first threshold level, the system controller may attempt to lower the humidity by operating the blower at a speed lower than that at which the blower would otherwise operate. After the blower has operated at the lower speed for some time, the humidity may fall below another threshold, which may be the same as or different from the first threshold. The system controller may then increase the blower speed to a higher level. Hereinafter, when reference is made to a threshold, it should be understood that there may be two thresholds, one for rising humidity and one for falling humidity, and a hysteresis level may thereby be provided.

Under some circumstances, after the blower has operated at the higher speed for some time, the indoor humidity may increase enough to again rise above the first threshold, thus causing the system controller to again operate the blower at the lower speed. The blower may continue to alternate between the lower speed and the higher speed as the humidity rises and falls. A change in the airflow speed may create a change in the indoor background noise that may be noticeable to occupants of the indoor space, and frequent changes in the sound of the blowing air may become annoying to the occupants. Therefore, it may be desirable to prevent the speed of a multi-speed blower from changing so frequently that the sound of the changes becomes an annoyance.

In an embodiment, the speed of a multi-speed blower is not allowed to change more frequently than a defined time interval. More specifically, when a cooling cycle of an HVAC system begins, a timer is started and is set to run for a specified time interval. The speed of a multi-speed blower in the HVAC system is not allowed to change during that cooling cycle until the time interval expires. After the time interval has passed, if the cooling cycle is still active, the blower speed may change if the system controller calls for a change. If the system controller does change the blower speed, the timer is restarted, and the blower speed is again prevented from changing during that cooling cycle until the time interval has expired again. The timer is also restarted at the beginning of the next cooling cycle. In this way, the speed of the multi-speed blower cannot change more frequently than the defined time interval, and nuisance changes in the sound of the airflow are prevented.

In an alternative embodiment, the timer may be reset upon expiring, and thus the speed of the multi-speed blower may change only at multiples of the timer interval. That is, if the humidity crosses a threshold after the timer has expired, the speed of the multi-speed blower may not change until the next expiration of the timer interval. For example, if the timer is set for 30 minutes and the humidity is above a threshold at the end of the 30 minutes, the speed of the multi-speed blower may not change at the end of the 30 minutes and the timer may be reset at the end of the 30 minutes. If the humidity crosses a threshold 10 minutes after the timer is reset, the speed of the multi-speed blower does not change until a second expiration of the timer.

As an example, a multi-speed blower in an HVAC system may operate at one of two speeds, a high speed and a low speed. When the HVAC system enters a cooling cycle, the system controller may set the speed of the blower based on the most recent humidity level information received from a humidity sensor. That is, if the humidity at the beginning of the cooling cycle is above a threshold, the system controller may cause the blower to operate at the low speed, and if the humidity at the beginning of the cooling cycle is not above a threshold, the system controller may cause the blower to operate at the high speed.

Substantially concurrently with the HVAC system entering the cooling cycle, a timer associated with the system controller is started. The timer may be set to time an interval of 15 minutes, 20 minutes, 30 minutes, 45 minutes, 60 minutes, or some other interval deemed appropriate. The timer setting may be based on a frequency of change in the airflow speed that is considered likely to avoid nuisance changes in background noise, as described above. The timer interval may be fixed by the manufacturer of the HVAC system or system controller, or the timer interval may be adjustable. In some embodiments, changes to the interval of an adjustable timer may be made only by the manufacturer of the HVAC system or system controller or by a representative of the manufacturer. In other embodiments, a homeowner, building manager, or other entity authorized to control the HVAC system after installation may be allowed to change the interval of an adjustable timer.

In an embodiment, no changes to the speed of the blower may be made until the timer interval expires. After the timer interval expires, the system controller may change the speed of the blower if the humidity level information received from the humidity sensor indicates that a change is needed. That is, if the humidity is above a threshold and the blower is at the high speed, the blower may be switched to the low speed. If the humidity is below a threshold and the blower is at the low speed, the blower may be switched to the high speed.

If, after the timer interval expires, the humidity level information received from the humidity sensor indicates that no change is needed, the blower remains at its current speed and does not change unless the indoor humidity later crosses a threshold. That is, if the humidity is above a threshold and the blower is at the low speed, the blower may remain at the low speed. If the humidity is below a threshold and the blower is at the high speed, the blower may remain at the high speed. In these cases, no change is made to the blower speed unless the humidity crosses a threshold from low to high, in which case the blower speed is changed from high to low, or the humidity crosses a threshold from high to low, in which case the blower speed is changed from low to high. If the system controller changes the blower speed, the timer is reset, and another change to the blower speed is not allowed during that cooling cycle until the timer expires again during that cooling cycle.

The timer settings and the changes to the blower speed may be affected by the ending of a cooling cycle, where a cooling cycle is a period in the cooling mode when cooling is actively occurring, as opposed to a period in the cooling mode when the thermostat is satisfied and the cooling components are temporarily idle. For example, if a cooling cycle ends before the timer expires, the timer is stopped and is restarted at the beginning of the next cooling cycle. If the timer expires before a cooling cycle ends, the blower speed may be changed in the remainder of the cooling cycle if a change is called for. If the blower speed is changed in the remainder of the cooling cycle, the timer is then restarted and the blower speed cannot be changed again during that cooling cycle until the timer expires again. Upon a second expiration of the timer in the same cooling cycle, the blower speed may or may not change, depending on the humidity level and a humidity threshold.

In summary, the timer is started whenever a cooling cycle begins or whenever a change is made to the blower speed. The timer is stopped whenever a cooling cycle ends or the timer expires. In some embodiments, the timer does not restart upon expiring unless a change is made to the blower speed responsive to the expiration of the timer. In other embodiments, the timer does restart upon expiring.

At least three different scenarios are possible for the case of a two-speed multi-speed blower. In one scenario, the humidity is below a threshold at the start of a cooling cycle, and in two scenarios, the humidity is above a threshold at the start of a cooling cycle. If the humidity is below a threshold at the start of a cooling cycle, the system controller will set the blower at a relatively high speed. Since the cooling cycle may remove moisture from the air, the humidity may be unlikely to rise above that threshold during the cooling cycle, barring a change in atmospheric conditions. Thus, it may be likely that the system controller will keep the blower at the high speed throughout the cooling cycle.

If the humidity is above a threshold at the start of a cooling cycle, the system controller will set the blower at a relatively low speed in an attempt to lower the humidity. At least two different scenarios are then possible. In one scenario, the humidity remains above that threshold throughout the cooling cycle, in which case the blower remains at the low speed throughout the cooling cycle. In this case, even if the timer expires during the cooling cycle, the blower speed does not change since the system controller will continue to call for the lower blower speed.

In another scenario in which the humidity is above a threshold at the start of a cooling cycle, the humidity falls below that threshold at some point during the cooling cycle. In this case, the action the system controller takes with regard to the blower speed depends on the status of the timer. If the timer has already expired at the time the humidity falls below the threshold, then the system controller switches the blower to the high speed at substantially the time that the humidity falls below the threshold. If the timer has not yet expired when the humidity falls below the threshold, then the system controller keeps the blower at the low speed when the humidity falls below the threshold. If the timer later expires and the HVAC system is still in the cooling cycle, then the system controller switches the blower to the high speed at substantially the time that the timer expires.

In either of the cases where the system controller switches the blower to the high speed, the timer may be reset at substantially the time of the change of speed, and the blower may not be allowed to change speeds again during the same cooling cycle until the timer expires again. However, as mentioned above, the humidity level may not be likely to rise from below a threshold to above that threshold during a cooling cycle unless a change in atmospheric conditions occurs. Thus, a change from the low speed to the high speed and back to the low speed may be unlikely during a cooling cycle.

When a cooling cycle ends, the indoor humidity may rise while the cooling components are idle and may surpass a threshold by the time the next cooling cycle begins. In this case, the two high-humidity scenarios that are possible at the beginning of a cooling cycle, as described above, will again apply.

Other scenarios are possible for the case of a multi-speed blower with more than two speeds. For example, if the humidity is above a threshold at the start of a cooling cycle, the blower may be set at a first speed. If the humidity falls below a first threshold during the cooling cycle and the timer has expired, the blower may be changed to a second speed and the timer may be reset. As the cooling cycle continues, the humidity may continue to drop and may cross a second threshold. If the timer has expired again when the second threshold is crossed, the blower may be changed to a third speed, and the timer may be reset again. The blower speed may then not be allowed to change again until the timer expires a third time during the cooling cycle.

In summary, during a cooling cycle, if the humidity crosses a threshold after the timer expires, the speed of the blower changes responsive to the humidity crossing the threshold. If the humidity crosses a threshold before the timer expires, the speed of the blower changes responsive to the expiration of the timer. If the cooling cycle ends before the humidity crosses a threshold or before the timer expires, the speed of the blower does not change during the cooling cycle. The timer may be restarted substantially concurrently with changing the speed of the blower, and the blower may be prevented from changing speeds again until the timer expires again, either in the same cooling cycle or in the next cooling cycle.

Figure 3:
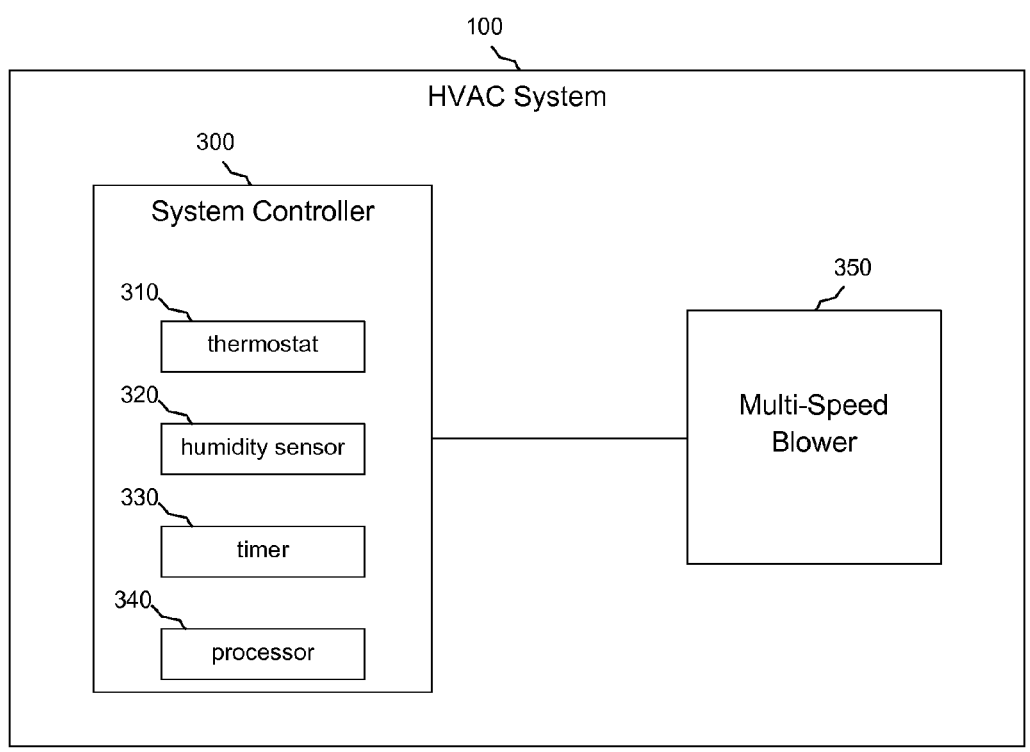
FIG. 3 is a schematic diagram of a system controller and a multi-speed blower.

Referring now to FIG. 3, an HVAC system 100 that includes a system controller 300 and a multi-speed blower 350 is shown that may be used to implement the embodiments disclosed herein. The system controller 300 may be substantially similar to the system controller 106 or indoor controller 124 of FIG. 1 and/or the system controller 106 of FIG. 2. FIG. 3 is intended merely as a conceptual diagram to illustrate the types of functionality that may be included in the system controller 300 in order to implement the embodiments disclosed herein. Any of components depicted separately in the system controller 300 may be combined in various combinations with one another. In this conceptual diagram, the system controller 300 includes a thermostat 310, a humidity sensor 320, a timer 330, and a processor 340.

The thermostat 310 may be any component capable of controlling the heating components, cooling components, and air movement components of an HVAC system. The thermostat 310 may also be capable of communicating with the humidity sensor 320, the timer 330, and the processor 340, such that timed control of the multi-speed blower 350 as described above is achieved. Additionally or alternatively, the thermostat 310 may be equivalent to a system controller, and the humidity sensor 320, the timer 330, and the processor 340 may be components within the thermostat 310.

The humidity sensor 320 may be capable of measuring relative humidity and providing the measured humidity levels to the system controller 300, as described above. While depicted as a component within the system controller 300, the humidity sensor 320 may be a stand-alone component outside the system controller 300.

The timer 330 may be capable of keeping track of a predefined time interval, as described above. While depicted as a stand-alone component within the system controller 300, the timer 330 may be a component within the processor 340 or the thermostat 310.

The processor 340 may be capable of receiving information from the humidity sensor 320 and the timer 330 and using that information to specify when the system controller 300 is allowed to change the speed of the multi-speed blower 350, as described above. While depicted as a stand-alone component within the system controller 300, the processor 340 may be a component within the thermostat 310.

Figure 4:
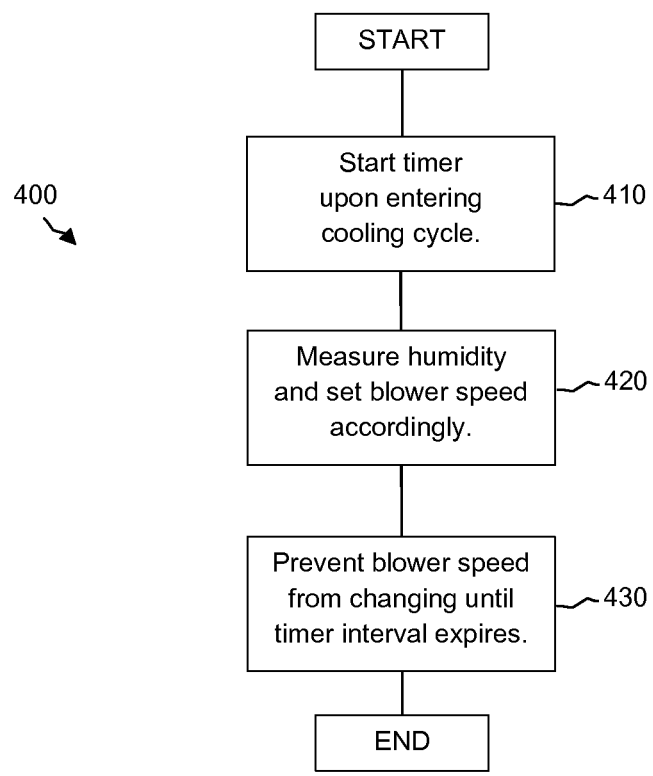
FIG. 4 is a flowchart of a method for operating an HVAC system.

Referring now to FIG. 4, a flowchart of a method 400 of operating an HVAC system is shown according to an embodiment of the disclosure. The method 400 may begin at block 410 by starting a timer at substantially the same time the HVAC system enters a cooling cycle. The method 400 may continue at block 420 by measuring the humidity in an indoor space ventilated by the HVAC system and setting the speed of a multi-speed blower accordingly. That is, if the humidity is above a threshold, the HVAC system sets the blower at a relatively lower speed, and if the humidity is below a threshold, the HVAC system sets the blower at a relatively higher speed. While block 420 is depicted occurring after block 410, the events at block 410 and block 420 may begin and/or occur substantially concurrently. The method 400 may conclude at block 430 by preventing the blower speed to change until the timer interval expires. At or after that time, the blower speed may be changed if the HVAC system deems a change necessary.

Figure 5:
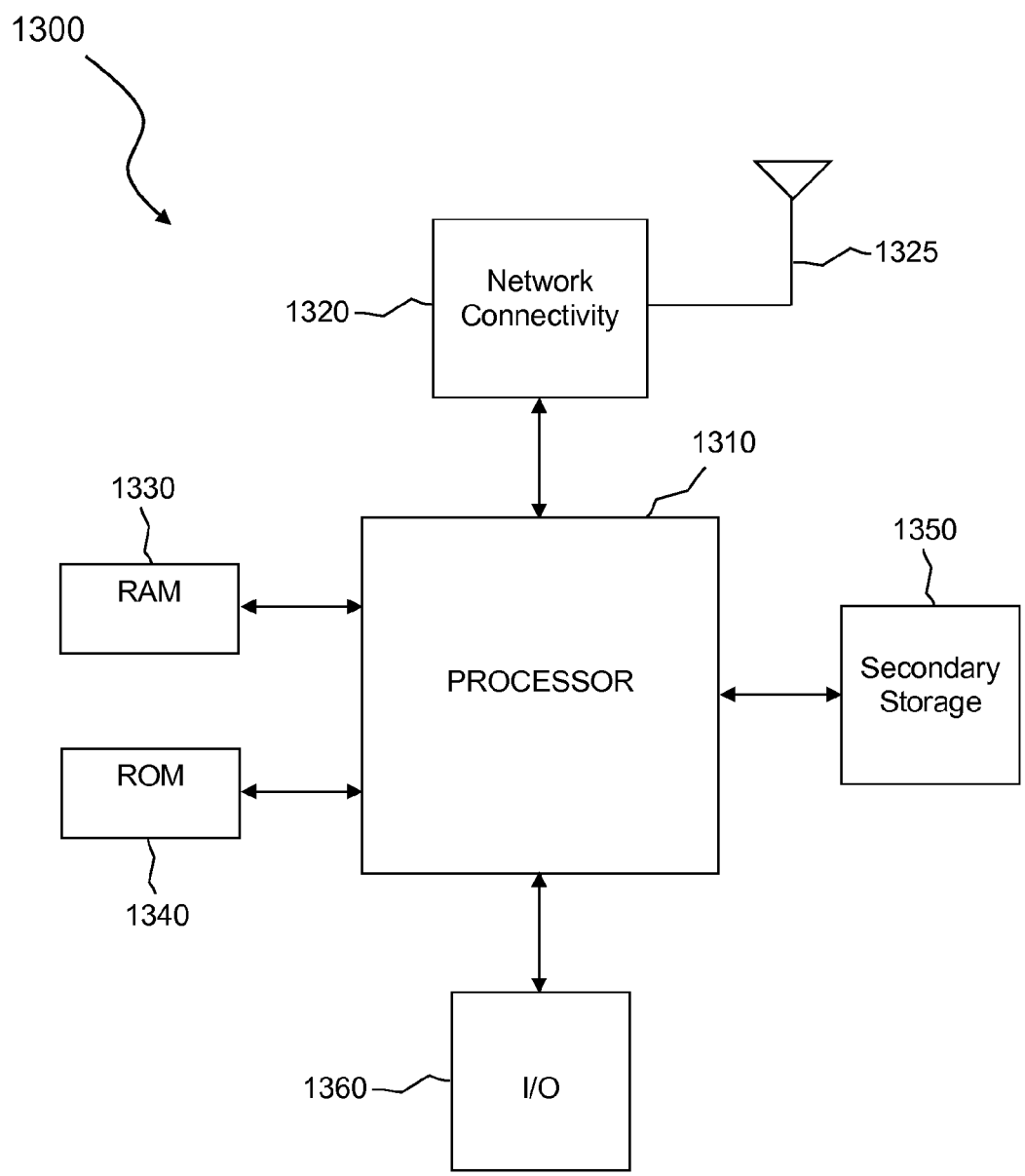
FIG. 5 is a schematic of a general-purpose processor (e.g., electronic controller or computer) system suitable for implementing the embodiments of the disclosure.

Referring now to FIG. 5, a schematic of a typical, general-purpose processor (e.g., electronic controller or computer) system 1300 that includes a processing component 1310 suitable for implementing one or more embodiments disclosed herein is shown according to an embodiment of the disclosure. In addition to the processor 1310 (which may be referred to as a central processor unit or CPU), the system 1300 might include network connectivity devices 1320, random access memory (RAM) 1330, read only memory (ROM) 1340, secondary storage 1350, and input/output (I/O) devices 1360. In some cases, some of these components may not be present or may be combined in various combinations with one another or with other components not shown. These components might be located in a single physical entity or in more than one physical entity. Any actions described herein as being taken by the processor 1310 might be taken by the processor 1310 alone or by the processor 1310 in conjunction with one or more components shown or not shown in the drawing.

The processor 1310 executes instructions, codes, computer programs, or scripts that it might access from the network connectivity devices 1320, RAM 1330, ROM 1340, or secondary storage 1350 (which might include various disk-based systems and/or other types of storage media such as hard disk, floppy disk, optical disk, or other drive). While only one processor 1310 is shown, multiple processors may be present. Thus, while instructions may be discussed as being executed by a processor, the instructions may be executed simultaneously, serially, or otherwise by one or multiple processors. The processor 1310 may be implemented as one or more CPU chips.

The network connectivity devices 1320 may take the form of modems, modem banks, Ethernet devices, universal serial bus (USB) interface devices, serial interfaces, token ring devices, fiber distributed data interface (FDDI) devices, wireless local area network (WLAN) devices, radio transceiver devices such as code division multiple access (CDMA) devices, global system for mobile communications (GSM) radio transceiver devices, worldwide interoperability for microwave access (WiMAX) devices, and/or other well-known devices for connecting to networks. These network connectivity devices 1320 may enable the processor 1310 to communicate with the Internet or one or more telecommunications networks or other networks from which the processor 1310 might receive information or to which the processor 1310 might output information.

The network connectivity devices 1320 might also include one or more transceiver components 1325 capable of transmitting and/or receiving data wirelessly in the form of electromagnetic waves, such as radio frequency signals or microwave frequency signals. Alternatively, the data may propagate in or on the surface of electrical conductors, in coaxial cables, in waveguides, in optical media such as optical fiber, or in other media. The transceiver component 1325 might include separate receiving and transmitting units or a single transceiver. Information transmitted or received by the transceiver 1325 may include data that has been processed by the processor 1310 or instructions that are to be executed by processor 1310. Such information may be received from and outputted to a network in the form of, for example, a computer data baseband signal or a signal embedded in a carrier wave. The data may be ordered according to different sequences as may be desirable for either processing or generating the data or transmitting or receiving the data. The baseband signal, the signal embedded in the carrier wave, or other types of signals currently used or hereafter developed may be referred to as the transmission medium and may be generated according to several methods well known to one skilled in the art.

The RAM 1330 might be used to store volatile data and perhaps to store instructions that are executed by the processor 1310. The ROM 1340 is a non-volatile memory device that typically has a smaller memory capacity than the memory capacity of the secondary storage 1350. ROM 1340 might be used to store instructions and perhaps data that are read during execution of the instructions. Access to both RAM 1330 and ROM 1340 is typically faster than to secondary storage 1350. The secondary storage 1350 is typically comprised of one or more disk drives or tape drives and might be used for non-volatile storage of data or as an over-flow data storage device if RAM 1330 is not large enough to hold all working data. Secondary storage 1350 may be used to store programs or instructions that are loaded into RAM 1330 when such programs are selected for execution or information is needed.

The I/O devices 1360 may include liquid crystal displays (LCDs), touch screen displays, keyboards, keypads, switches, dials, mice, track balls, voice recognizers, card readers, paper tape readers, printers, video monitors, transducers, sensors, or other well-known input or output devices. Also, the transceiver 1325 might be considered a component of the I/O devices 1360 instead of or in addition to being a component of the network connectivity devices 1320.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as "comprises", "includes", and "having" should be understood to provide support for narrower terms such as "consisting of", "consisting essentially of", and "comprised substantially of". Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present invention.

What is claimed is:

1. A method of operating a heating, ventilation, and air conditioning (HVAC) system, comprising:
   providing an HVAC comprising a humidity sensor and a multi-speed blower;
   initiating a cooling cycle of the HVAC system;
   starting a timer concurrently with the initiation of the cooling cycle;
   setting a speed of the multi-speed blower upon initiation of the cooling cycle based on a comparison of a humidity level sensed by the humidity sensor at the beginning of the cooling cycle and a humidity threshold; and
   preventing the multi-speed blower from changing speeds until the timer expires, wherein a speed of the multi-speed blower is allowed to change after the timer expires;
   changing the speed of the multi-speed blower in response to the humidity level crossing the humidity threshold after the timer has expired;
   restarting the timer concurrently with changing the speed of the multi-speed blower; and
   preventing the multi-speed blower from changing speeds until the restarted timer expires.

2. The method of claim 1, further comprising: changing the speed of the multi-speed blower in response to the humidity level crossing the humidity threshold after the restarted timer has expired; and restarting the timer again in response to changing the speed of the multi-speed blower.

3. The method of claim 1, wherein, when a humidity level crosses the humidity threshold before the timer has expired, the speed of the multi-speed blower changes responsive to the expiration of the timer.

4. The method of claim 1, wherein the speed of the multi-speed blower does not change during the cooling cycle if the cooling cycle ends before a humidity level crosses the humidity threshold or before the timer expires.

5. A heating, ventilation, and air conditioning (HVAC) system, comprising:
   a humidity sensor;
   a multi-speed blower; and
   a system controller configured to:
      initiate a cooling cycle of the HVAC system;
      start the timer concurrently with the initiation of the cooling cycle;
      set a speed of the multi-speed blower upon initiation of the cooling cycle based on a comparison of a humidity level sensed by the humidity sensor at the initiation of the cooling cycle and a humidity threshold;
      prevent the multi-speed blower from changing speeds until the timer expires, wherein a speed of the multi-speed blower is allowed to change after the timer expires; and
      change the speed of the multi-speed blower responsive to the humidity level crossing the humidity threshold when the humidity level crosses the humidity threshold after the timer has expired,
      wherein the timer is restarted concurrently with changing the speed of the multi-speed blower, and wherein the multi-speed blower is prevented from changing speeds during the cooling cycle until the restarted timer expires.

6. The HVAC system of claim 5, wherein, when the humidity level crosses the humidity threshold before the timer has expired, the speed of the multi-speed blower changes responsive to the expiration of the timer.

7. The HVAC system of claim 5, wherein the speed of the multi-speed blower does not change during the cooling cycle if the cooling cycle ends before a humidity level crosses the humidity threshold or before the timer expires.

8. A system controller for a heating, ventilation, and air conditioning (HVAC) system, comprising:
   a processor configured to:
      initiate a cooling cycle of the HVAC system;
      start a timer concurrently with the initiation of the cooling cycle;
      set a speed of a multi-speed blower upon initiation of the cooling cycle based on a comparison of a humidity level sensed by a humidity sensor at the initiation of the cooling cycle and a humidity threshold;

prevent the multi-speed blower from changing speeds until the expiration of the timer; and upon expiration of the timer, selectively change the speed of the multi-speed blower in response to the humidity level crossing the humidity threshold, and selectively maintain the speed of the multi-speed blower in response to the humidity level not crossing the humidity threshold;

change the speed of the multi-speed blower in response to the humidity level crossing the humidity threshold when the humidity level crosses the humidity threshold after the timer has expired;

wherein the timer is restarted concurrently with changing the speed of the multi-speed blower, and wherein the multi-speed blower is prevented from changing speeds during the cooling cycle until the restarted timer expires.

9. The system controller of claim 8, wherein, when the humidity level crosses the humidity threshold before the timer has expired, the processor is configured to change the speed of the multi-speed blower in response to the expiration of the timer.

10. The system controller of claim 8 wherein the speed of the multi-speed blower does not change during the cooling cycle if the cooling cycle ends before a humidity level crosses the humidity threshold or before the timer expires.

\* \* \* \* \*